United States Patent [19]
Conner

[11] Patent Number: 5,765,169
[45] Date of Patent: Jun. 9, 1998

[54] METHOD AND APPARATUS FOR CONVERTING LONG FILE NAMES TO SHORT FILE NAMES

[75] Inventor: Christopher John Conner, Leander, Tex.

[73] Assignee: International Business Machines Corporation, Armonk, N.Y.

[21] Appl. No.: 723,181

[22] Filed: Sep. 30, 1996

[51] Int. Cl.$^6$ .................................................. G06F 17/30
[52] U.S. Cl. .................. 707/200; 707/1; 707/101
[58] Field of Search ................. 707/1, 200, 101

[56] References Cited

U.S. PATENT DOCUMENTS

| | | | |
|---|---|---|---|
| 5,307,494 | 4/1994 | Yasumatsu et al. | 707/200 |
| 5,410,475 | 4/1995 | Lu et al. | 364/419.01 |
| 5,627,996 | 5/1997 | Bauer | 395/500 |

*Primary Examiner*—Thomas G. Black
*Assistant Examiner*—Donald Min
*Attorney, Agent, or Firm*—David A. Mims, Jr.

[57] ABSTRACT

A method and apparatus for converting long file names to short file names having an eight character prefix and a three character extension. The long file name is examined and separated into a prefix portion and suffix/extension portion. The prefix and suffix portions of the file name are then converted to short file names using the following steps working from right to left: 1) remove lower case vowels; 2) remove lower case consonants; 3) remove upper case vowels; 4) remove upper case consonants; 5) remove single digit numbers; 6) and remove special characters. When the prefix and suffix have been reduced to the desired number of characters, the two portion are concatenated to form a shorten file name.

15 Claims, 7 Drawing Sheets

METHOD AND APPARATUS FOR CONVERTING LONG FILE NAMES TO SHORT FILE NAMES

FIELD OF THE INVENTION

The present invention relates to data processing systems, and more particularly, to converting long file names to short file names.

BACKGROUND OF THE INVENTION

Personal computers are as common in the workplace today as telephones, fax machines, and copy machines. Users are increasingly requiring their personal computers have the capability of being tailored to their individual preferences and personal tastes. For example, some modern multitasking operating systems allow users to create file names up to 255 characters long describing the nature of a file. Traditionally, file names (i.e., FILENAME.EXT) have been limited to a maximum of eight characters (prefix, "FILENAME") with an additional three character extension (suffix, "EXT") which require often confusing abbreviations, and thus hinders the user from generating a clear and meaningful file name. Problems occur when the long file names must be shorten for use in traditional systems using short file names. Such needs arise when porting software products written for a long file name system to a short file name system, or when converting data from a long file name system to a short file name system.

One prior art technique truncates all but the first eight characters of the prefix and the first three characters of the suffix/extension to convert the long file names for use in short file names systems. The problem with such a technique is that much of the original meaning of the long file name is lost in the conversion process. It is therefore desirable to have a method and apparatus for allowing a user to convert long file names to short file names while retaining the original meaning of the long file name.

SUMMARY OF THE INVENTION

This invention relates to a method and apparatus for converting long file names to short file names having an eight character prefix and a three character extension. A procedure is provided which examines a long file name containing an extension, and separates it into a prefix portion and suffix/extension portion. The prefix and suffix portions of the file name are then converted to short file names using the following steps working from right to left: 1) remove lower case vowels; 2) remove lower case consonants; 3) remove upper case vowels; 4) remove upper case consonants; 5) remove single digit numbers; 6) and remove special characters. When the prefix and suffix have been reduced to the desired number of characters, the two portion are concatenated to form a shorten file name.

DETAILED DESCRIPTION OF THE EMBODIMENTS

This invention provides a method and apparatus for converting long file names into short file names having an eight character prefix and a three character extension. A long file name as used in this invention is of variable character length and may contain an extension of variable length. For example, the long file name "SAMPLELONGFILENAME.LONGEXTENSION" has a separation mark (i.e., a period) separating a prefix, SAMPLELONGFILENAME, from a suffix, LONGEXTENSION. The invention converts the long file name to a short file name while retaining as much of the original meaning as possible. The invention will be more fully described using the following drawings.

Figure 1:
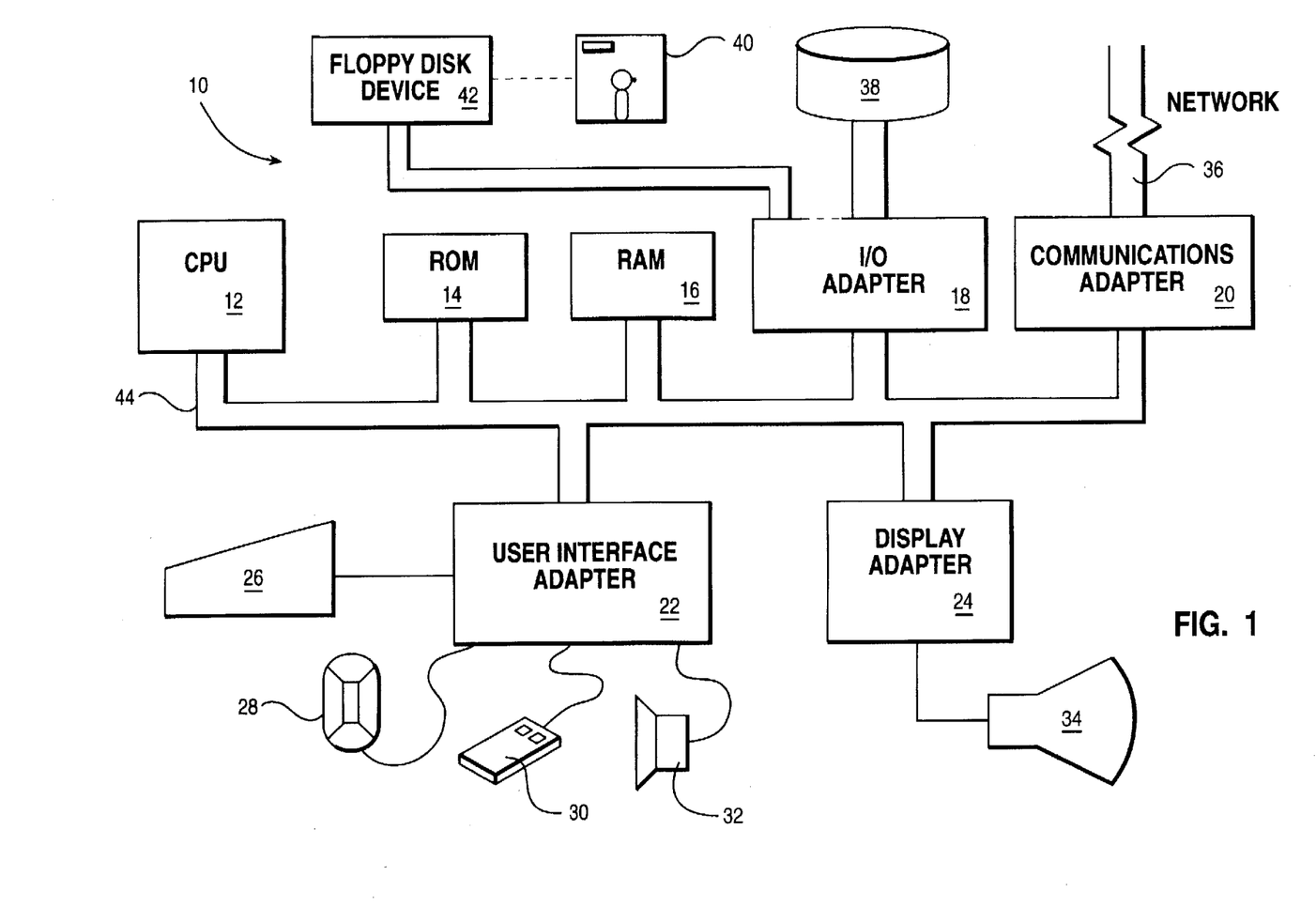
FIG. 1 depicts a workstation where the invention may be practice.
Figure 2:
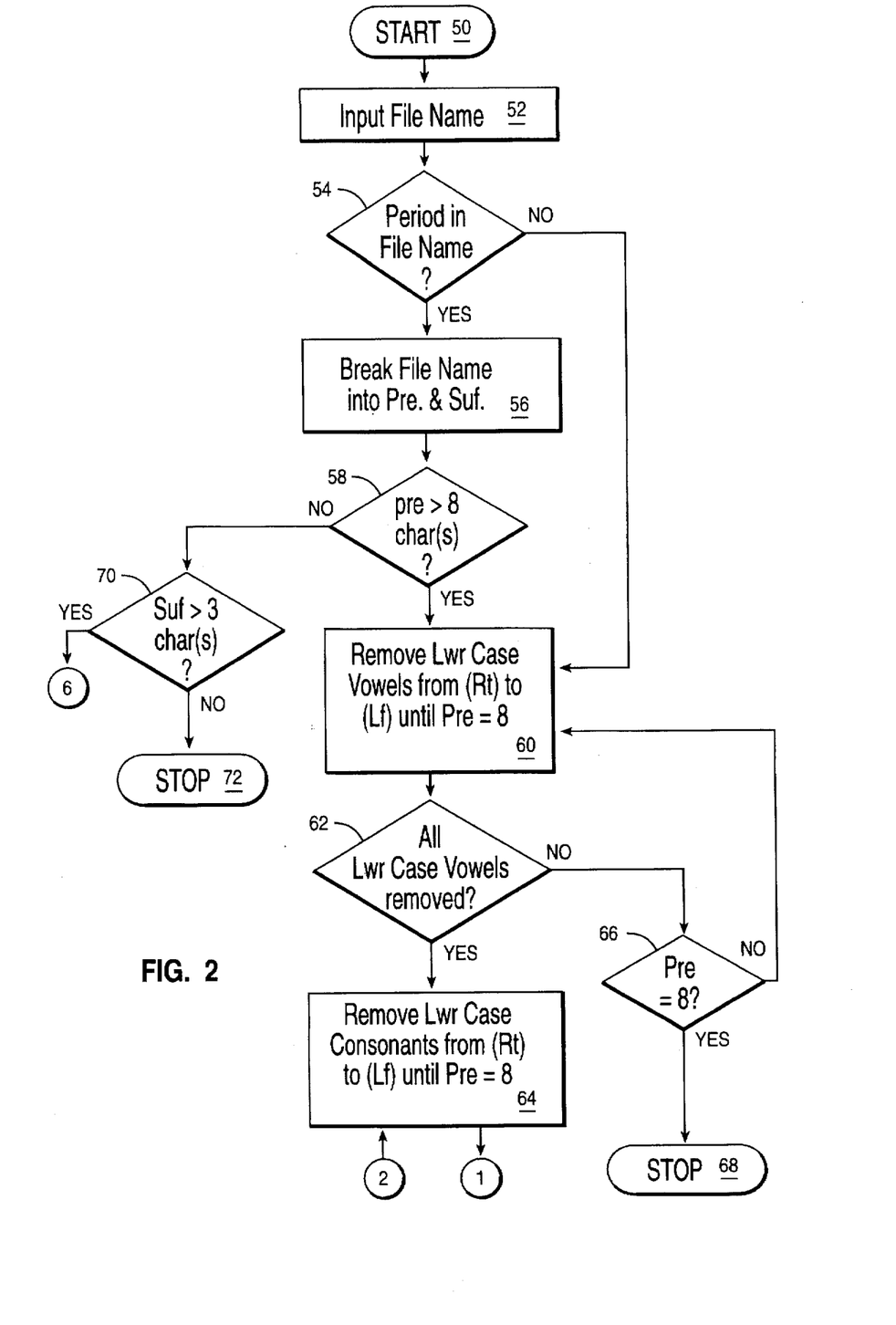
FIGS. 2–7 are flow diagrams for converting long file names to short file names using the invention.

Referring to FIG. 1, there is shown a workstation/data processing system 10 where the invention may be practiced. The workstation 10, contains a CPU 12, connected to random access memory (RAM) 16, read only memory (ROM) 14, through a bus 44. The CPU 12, is capable of communicating with a plurality of Input/Output (I/O) devices through I/O adapter 18. Hard disk storage 38, provides permanent storage of data/information for use by the CPU 12. A floppy disk device 42, provides means for inputting data from a computer program product having a computer readable medium such as a floppy diskette 40. One skilled in the art will appreciate that the computer program of this invention may be inputted to the CPU 12, via the floppy diskette 40. A display monitor 34, is provided to allow a user to observe the execution of data on the CPU 12. Data can also be inputted to the CPU 12, through keyboard 26, and microphone 28. Data displayed on monitor 34, can be manipulated using mouse 30. Output from programs operating on CPU 12, may be obtained over speaker 32. The workstation 10 may be connected to a network (not shown), through communication adapter 20. Referring now to FIGS. 2–7, there is shown flow diagrams for converting long file names to short file names using the invention. Pseudo code for performing this conversion is also shown in Table A. With particular reference to FIG. 2, the procedure starts at block 50, and proceeds immediately to block 52 where the long file name is inputted. At block 54, the procedure checks to see if a period exists in the long file name. If YES, at block 56 the procedure breaks the long file name into a prefix portion consisting of the characters before the period, and a suffix portion consisting of the characters after the period. At block 58, the procedure determines if the prefix portion of the long file name is greater than 8 characters. If YES, the procedure removes the lower case vowels from the prefix portion of the long file name working from right to left until the prefix portion of the file name is equal to eight characters. Returning to block 58, if the procedure determines that the prefix portion of the file name is eight characters or less, processing proceeds to block 70, where the suffix portion of the file name is checked to determine if it is greater than 3 characters. If YES, processing continues at block 120 of FIG. 5. If NO, the file name is already in the shorten form and the procedure stops at block 72. Returning to block 60, after the lower case vowels have been removed, the procedure checks at block 62 to determine if all lower case vowels have been removed. If YES, the procedure removes lower case consonants from right to left until the prefix equals eight. If NO, processing proceeds to block 66 where a check is conducted to determine if the prefix is equal to 8 characters. If YES, the procedure stops at block 68. If NO, the procedure returns to block 60 where any additional lower case vowels are removed from the prefix.

TABLE A

```
PSEUDO CODE FOR CONVERTING LONG FILE NAMES
---------------------WHILE (LONGNAME>8.3)
REMOVE LOWER CASE VOWELS FROM RIGHT TO LEFT UNTIL
LONGNAME = 8.3
    IF (LONGNAME > 8.3)
REMOVE LOWER CASE CONSONANTS FROM RIGHT TO LEFT
UNTIL LONGNAME = 8.3
    IF (LONGNAME > 8.3)
REMOVE UPPER CASE VOWELS FROM RIGHT TO LEFT UNTIL
LONGNAME = 8.3
    IF (LONGNAME > 8.3)
REMOVE UPPER CASE CONSONANTS FROM RIGHT TO LEFT
UNTIL LONGNAME = 8.3
    IF (LONGNAME > 8.3)
REMOVE SINGLE DIGIT NUMBERS FROM RIGHT TO LEFT UNTIL
LONGNAME = 8.3
    IF (LONGNAME > 8.3)
REMOVE SPECIAL CHARACTERS ($!@#%_-) FROM RIGHT TO
LEFT UNTIL LONGNAME = 8.3
END WHILE
```

Figure 3:
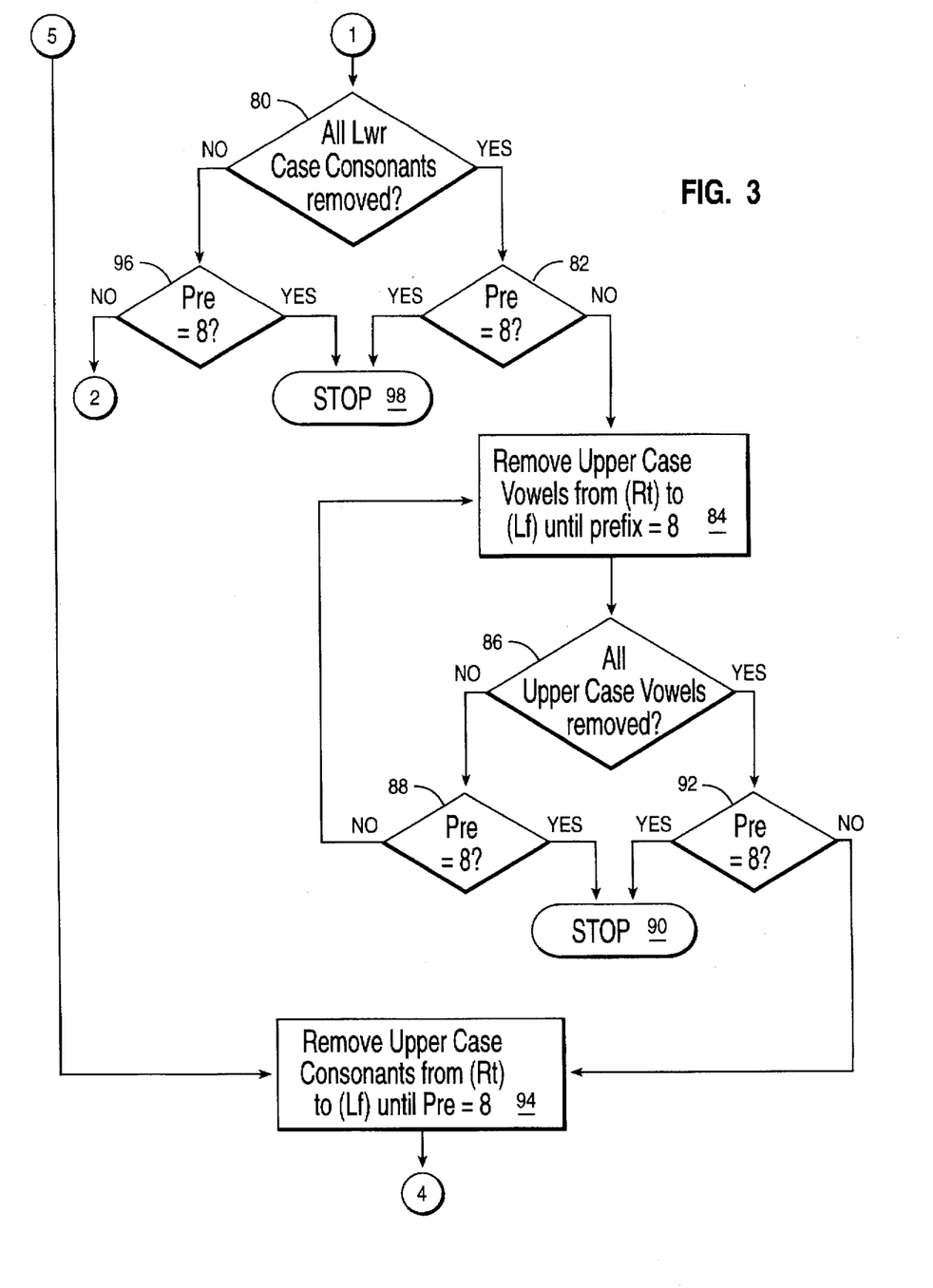

Referring now to FIG. 3, at block 80, a check is carried out to determine if all lower case consonants have been removed from the prefix portion of the file name. If YES, processing continues at block 82 where a check is conducted to determine if the prefix has been reduced to 8 characters. If YES, the procedure stops at block 98 with the shorten prefix name. If NO, the procedure removes any upper case vowels in the prefix moving from right to left until the prefix portion of the long name is equal to eight characters as shown in block 84. Returning to block 80, if all lower case consonants have not been removed, at block 96 the procedure determines if the prefix is equaled to 8 characters. If YES, the procedure stops at block 98 with the short file name. If NO, processing returns to block 64 (FIG. 2) to remove any additional lower case consonants. Returning to block 84, after removing the upper case vowels from the prefix, a check is conducted at block 86 to determine if all upper case vowels have been removed. If NO, at block 88 the procedure determines if the prefix portion is equal to eight characters. If YES, the procedure stops at block 90. If NO, processing returns to block 84 to remove any additional upper case vowels. Returning to block 86, if all upper case vowels have been removed from the prefix, at block 92 the procedure checks to see if the prefix is equal to 8 characters. If YES, the procedure stops at block 90 with the shorten prefix file name. Else, processing continues at block 94 where the procedure removes upper case consonants from the prefix starting from right to left until the prefix portion is equal to eight characters.

Figure 4:
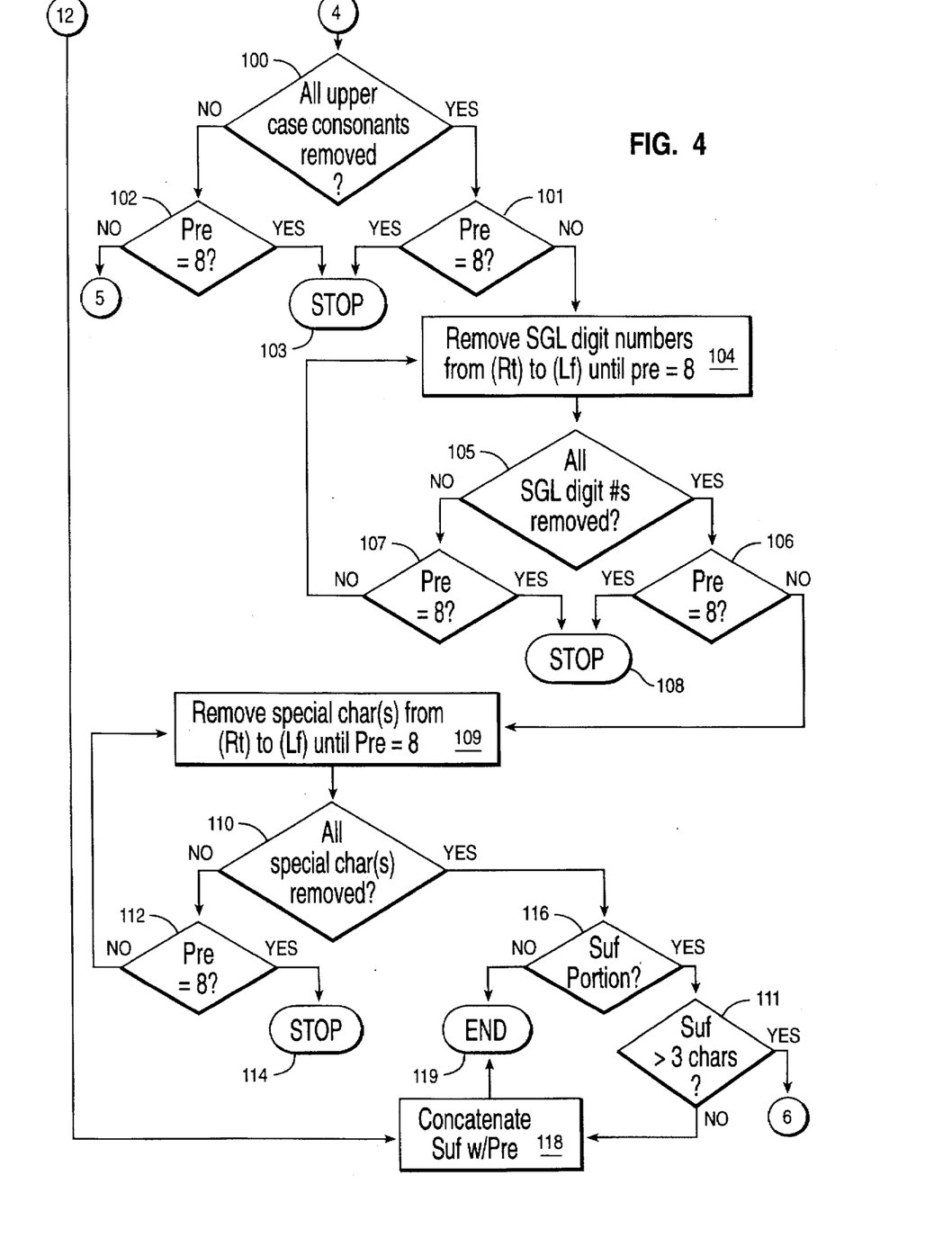

Turning now to FIG. 4, after removing the upper case consonants from the prefix, the procedure checks at block 100 to see if all the upper case consonants have been removed. If YES, the procedure checks to see if the prefix has been reduced to eight characters at block 101. If YES, the procedure stops at block 103 with the shorten prefix. If NO, processing proceeds to block 104 where single digit numbers are removed working from right to left until the prefix equals eight. Returning to block 100, if all upper case consonants have not been removed, the procedure checks at block 102 whether the prefix equals eight. If YES, the procedure stops at block 103. If NO at block 102, removal of any remaining upper case consonants is carried out at block 94 (FIG. 3). Returning to block 104, after removing single digit numbers from the prefix, a check is carried out at block 105 to determine if the single digit numbers have been removed. If YES, at block 106 a check is performed to determine if the prefix has been reduced to eight characters. If YES, processing ends at block 108 with the shorten prefix. If NO, processing continues at block 109 where special characters are removed from the prefix working from right to left until the prefix equals eight. Returning to block 105, if all the single digit numbers have not been removed, processing moves to block 107 where the prefix is checked to determine if it equals eight characters. If YES, processing stops at block 108. If the prefix is greater than eight characters, processing returns to block 104 to remove any remaining single digit numbers. Returning to block 109, after initiating the procedure to remove special characters from the prefix, a check is performed at block 110 to determine if all the special characters have been removed. If NO, a check is carried out at block 112 to determine if the prefix is equal to eight characters. If YES, processing stops at block 114. If NO, processing returns to block 109 to remove any remaining special characters. Returning to block 110, if all the special characters have been removed, processing proceeds to block 116 where a check is done to determine if a suffix portion exist. If NO, processing ends at block 119. If YES, then processing proceeds to block 111 where a check is made to determine if the suffix is greater than three characters. If NO, processing proceeds to block 118 to concatenate the prefix and suffix. If YES, then processing proceeds to block 120 (FIG. 5) to reduce the suffix to three characters.

Figure 5:
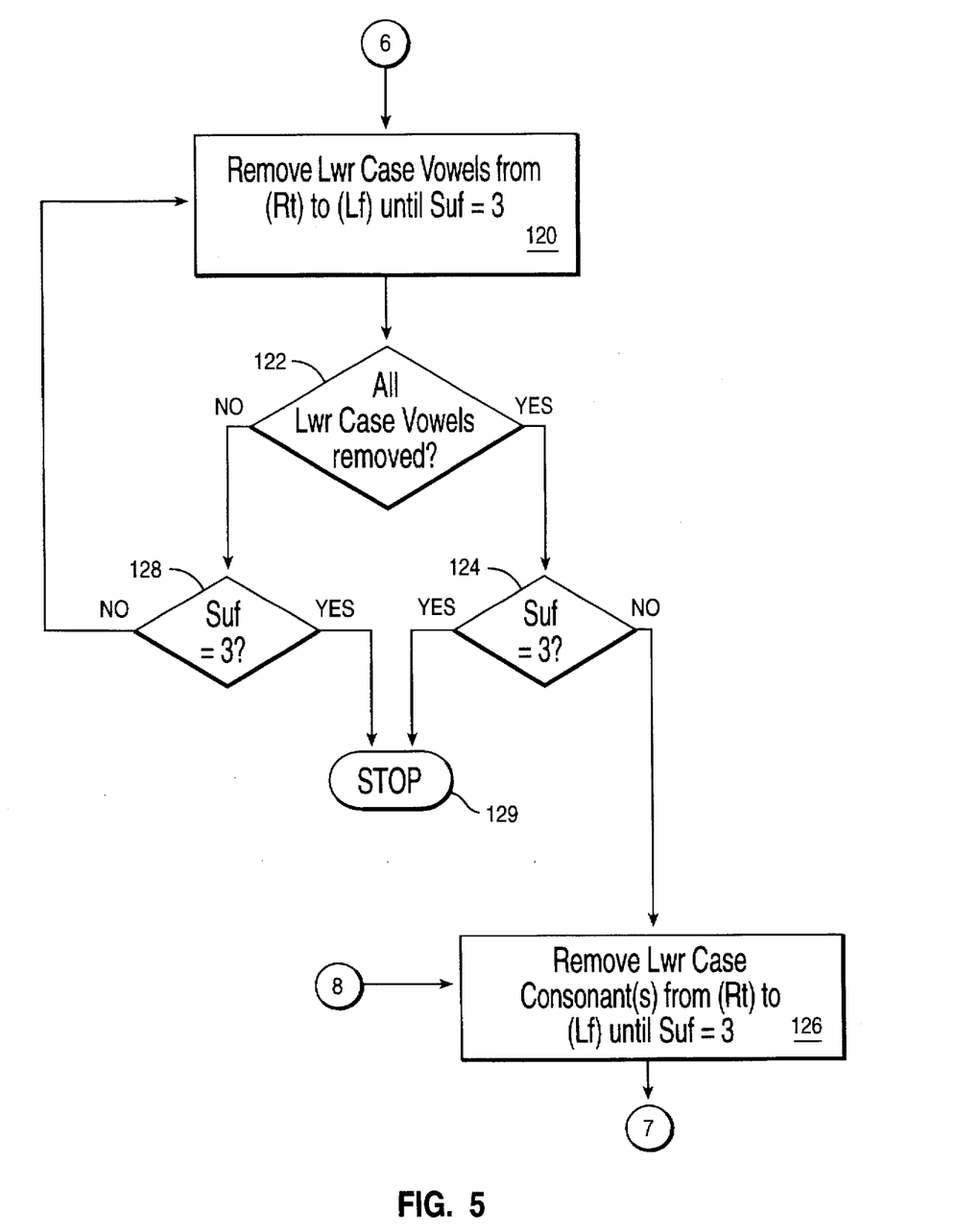

Referring to FIG. 5, similar processing carried out for the prefix portion of the file name is executed for the suffix portion which must be shorten to three characters. At block 120, the procedure removes lower case vowels from right to left until the suffix equals 3. At block 122, the procedure determines if all lower case vowels have been removed. If NO, at block 128, a check is carried out to determine if the suffix is equal to 3 characters. If YES, the procedure ends at block 129. If NO, processing returns to block 120 to remove any additional vowels. Once all the lower case vowels have been removed, a check is conducted at block 124 to determine if the suffix is equal to three characters. If YES, processing ends at block 129 with the shorten suffix. If NO, the procedure removes any lower case consonants from the suffix moving from right to left until the suffix equals three.

Figure 6:
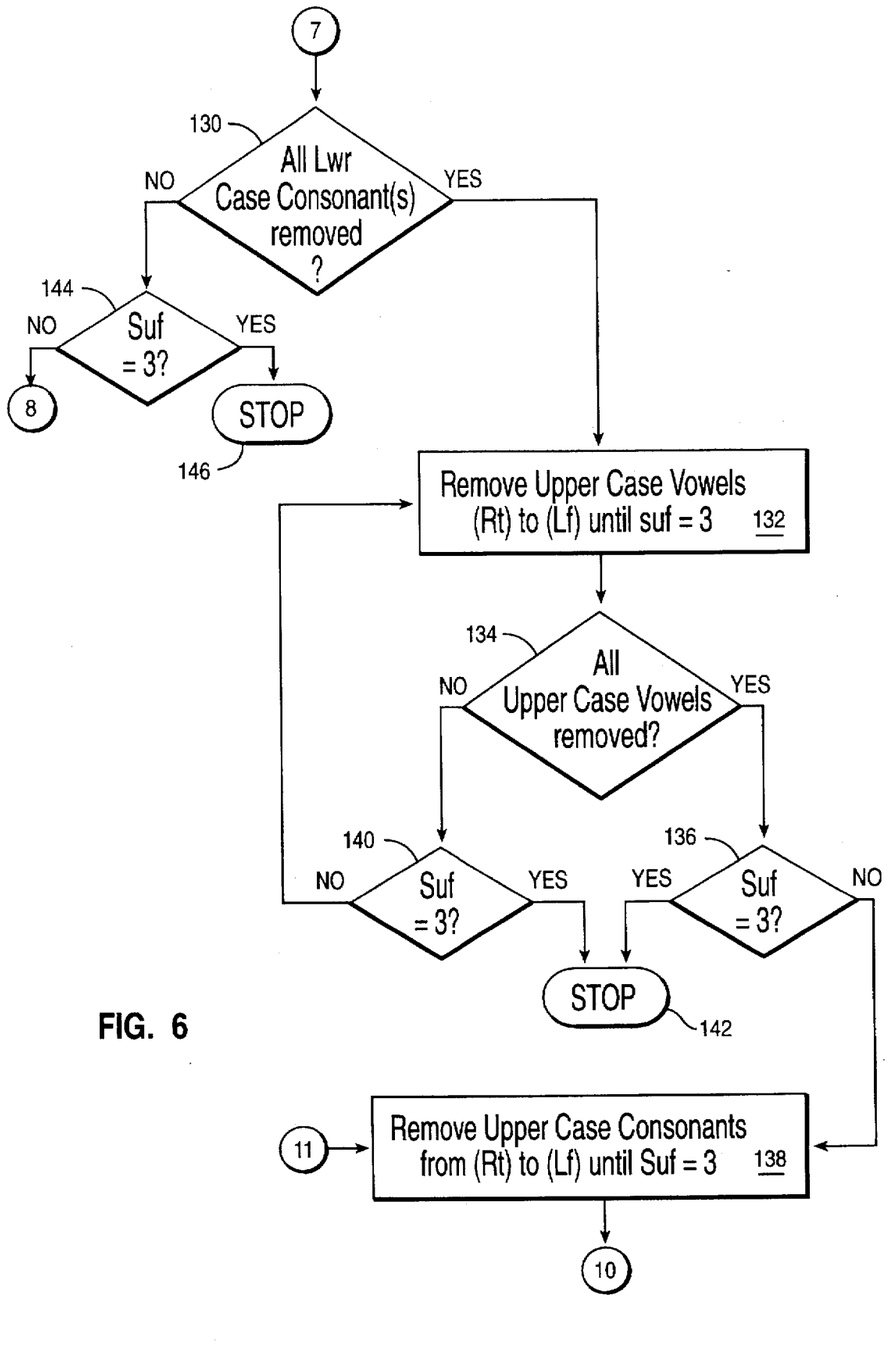

Turning to FIG. 6, after initiating the removal of lower case consonants from the suffix, the procedure checks at block 130 to determine if all lower case consonants have been removed. If NO, a check is conducted at block 144 to determine if the suffix is equal to three characters. If YES, processing ends at block 146 with the shorten suffix portion. If NO, processing returns to block 126 (FIG. 5) to remove any additional consonants. Returning to block 130, if all lower case consonants have been removed, at block 132 the procedure removes upper case vowels from the suffix portions moving from right to left until the suffix equals three. A check is carried out at block 134 to determine if all upper case vowels have been removed. If NO, processing continues at block 140 to check if the suffix has been reduced to 3 characters. If YES, the procedures stops at block 142 with the shorten suffix. If NO, the procedure returns to block 132 for the removal of any additional upper case vowels. If it is determined at block 134 that all upper case vowels have been removed, at block 136 the procedure determines if the suffix is equal to three characters. If YES, the procedure stops at block 142 with the shorten suffix portion. If the suffix is not equal to three, at block 138 the procedure removes upper case consonants from the suffix from right to left.

Figure 7:
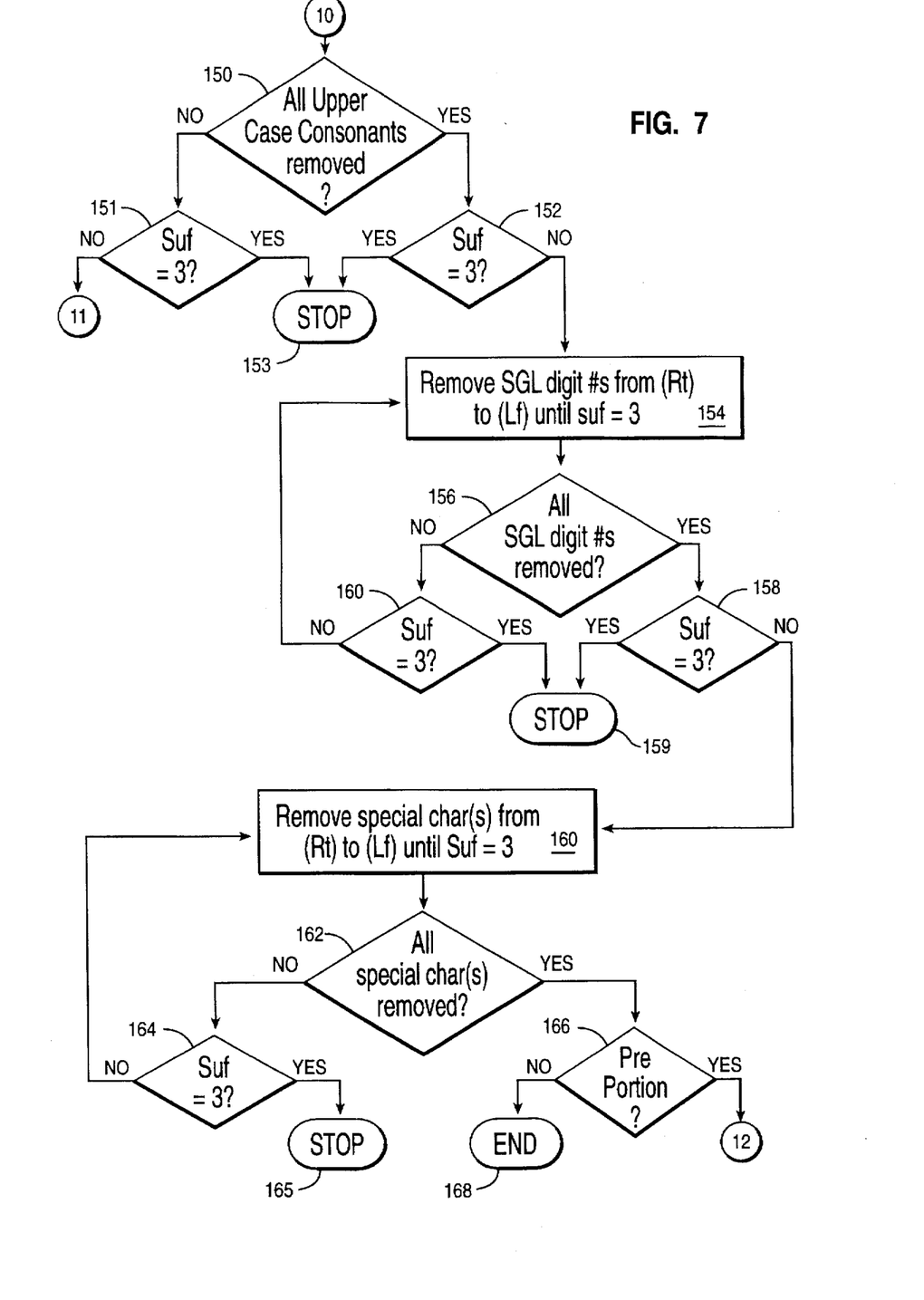

Referring now to FIG. 7, the procedure removes upper case consonants from the suffix and checks at block 150 to determine if all the upper case consonants have been removed. If YES, at block 152 the procedure determines if the suffix equals three. If YES, the procedure stops at block 153. If NO, processing continues at block 154 where the procedure removes all single digit numbers moving from right to left. At block 156, the procedure determines if all single digit numbers have been removed. If NO, at block 160 a check is conducted to determine if the suffix is three characters. If YES, the procedure ends at block 159. If NO, the procedure returns to block 154 to remove any additional single digit numbers. Returning to block 160, after removing all special characters, a check is carried out at block 162 to determine if all the characters are removed. If NO, at block 164 a check is conducted to determine if the suffix is equal to three. If YES, the procedure stops at block 165. If NO, the procedure returns to block 160 to remove any remaining special characters. Returning to block 162, if all the special characters have been removed, at block 166 a check is performed to determine if a prefix portion exists. If NO, the procedure ends at block 168. If YES, the suffix is concatenated with the prefix at block 118 (FIG. 4).

An example describing operation of the invention will now be given.

EXAMPLE 1:
* denotes UPPER CASE LETTERS

```
       *    *   *  *  * *        *
FILENAME = SampleLongFileNameToConvert.Extension

*    *   *  *  * *
PREFIX = SampleLongFileNameToConvert

*
SUFFIX = Extension

*   * * * * *
CONVERTED 8.3 FILE NAME = SmpLFNTC.Ext
```

EXAMPLE 2:
```
           *          *
FILENAME = PrimitiveClass.cpp

*          *
PREFIX = PrimitiveClass

SUFFIX = cpp

*    *
CONVERTED 8.3 FILE NAME = PrmtvCls.cpp
```

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer, for converting a long file name into a short file name, comprising:
   providing said long file name in said computer for conversion into said short file name;
   determining a desired size for said short file name;
   converting said long file name to said short file name by the sequential applications of the following steps:
   removing lower case vowels until said desired size is reached,
   removing lower case consonants until said desired size is reached;
   removing upper case vowels until said desired size is reached;
   removing upper case consonants until said desired size is reached;
   removing single digit numbers until said desired size is reached; and
   removing special characters until said desired size is reached.

2. The method of claim 1 wherein the providing step further comprises:
   detecting a separator mark in said long file name; and
   separating said long file name into a prefix portion and a suffix portion.

3. The method of claim 2 wherein said determining step further comprises:
   selecting said desired size that is different for said prefix and suffix portions.

4. The method of claim 1 wherein said removing step further comprises:
   working from right to left to remove the characters from said long file name.

5. The method of claim 1 wherein said converting step further comprises:
   concatenating said suffix and prefix with said separator mark when said desired size have been reached.

6. An apparatus for converting a long file name into a short file name, comprising:
   means for providing said long file name in said computer for conversion into said short file name;
   means for determining a desired size for said short file name;
   means for converting said long file name to said short file name by the sequential applications of the following steps:
   means for removing lower case vowels until said desired size is reached, means for removing lower case consonants until said desired size is reached;
   means for removing upper case vowels until said desired size is reached;
   means for removing upper case consonants until said desired size is reached;
   means for removing single digit numbers until said desired size is reached; and
   means for removing special characters until said desired size is reached.

7. The apparatus of claim 6 wherein the means for providing further comprises:
   means for detecting a separator mark in said long file name; and
   means for separating said long file name into a prefix portion and a suffix portion.

8. The apparatus of claim 6 wherein the means for determining further comprises:
   means for selecting said desired size that is different for said prefix and suffix portions.

9. The apparatus of claim 6 wherein the means for removing further comprises:
   means for working from right to left to remove the characters from said long file name.

10. The apparatus of claim 6 wherein said means for converting further comprises:
    means for concatenating said suffix and prefix with said separator mark when said desired size have been reached.

11. A computer program product having a computer readable medium having computer program logic recorded thereon for converting a long file name into a short file name, comprising:

computer readable means for providing said long file name in said computer for conversion into said short file name;

computer readable means for determining a desired size for said short file name;

computer readable means for converting said long file name to said short file name by the sequential applications of the following computer readable means:

computer readable means for removing lower case vowels until said desired size is reached, computer readable means for removing lower case consonants until said desired size is reached;

computer readable means for removing upper case vowels until said desired size is reached;

computer readable means for removing upper case consonants until said desired size is reached;

computer readable means for removing single digit numbers until said desired size is reached; and computer readable means for removing special characters until said desired size is reached.

12. The computer program product of claim 11 wherein said computer readable medium means for providing further comprises:

computer readable means for detecting a separator mark in said long file name; and computer readable means for separating said long file name into a prefix portion and a suffix portion.

13. The computer program product of claim 11 wherein said computer readable medium means for determining further comprises:

computer readable means for selecting said desired size that is different for said prefix and suffix portions.

14. The computer program product of claim 11 wherein the computer readable means for removing further comprises:

computer readable means for working from right to left to remove the characters from said long file name.

15. The apparatus of claim 11 wherein said computer readable means for converting further comprises:

computer readable means for concatenating said suffix and prefix with said separator mark when said desired size have been reached.

* * * * *

UNITED STATES PATENT AND TRADEMARK OFFICE
CERTIFICATE OF CORRECTION

PATENT NO. : 5,765,169
DATED : June 9, 1998
INVENTOR(S) : Conner

It is certified that error appears in the above-identified patent and that said Letters Patent is hereby corrected as shown below:

Column 6, line 35, after "reached;" please delete "means for removing lower";
    line 36, before "case" please insert --means for removing lower--.

Signed and Sealed this

Twenty-fifth Day of May, 1999

Attest:

Q. TODD DICKINSON

*Attesting Officer*      *Acting Commissioner of Patents and Trademarks*